United States Patent
Wu

(10) Patent No.: US 10,831,073 B1
(45) Date of Patent: Nov. 10, 2020

(54) LIQUID CRYSTAL ON SILICON DISPLAY AND A METHOD OF FORMING THE SAME

(71) Applicant: Himax Display, Inc., Tainan (TW)

(72) Inventor: Meng-Ju Wu, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/701,726

(22) Filed: Dec. 3, 2019

(51) Int. Cl.
  *G02F 1/1362* (2006.01)
  *G02F 1/1339* (2006.01)
  *G02F 1/1343* (2006.01)
  *G02F 1/1335* (2006.01)

(52) U.S. Cl.
  CPC ...... *G02F 1/136277* (2013.01); *G02F 1/1339* (2013.01); *G02F 1/13439* (2013.01); *G02F 1/133502* (2013.01); *G02F 2202/16* (2013.01); *G02F 2202/28* (2013.01)

(58) Field of Classification Search
  CPC .................................................. G02F 1/136277
  See application file for complete search history.

(56) References Cited

U.S. PATENT DOCUMENTS

2014/0085579 A1* 3/2014 Fan ............... G02F 1/133351
                                                    349/123

\* cited by examiner

*Primary Examiner* — Edmond C Lau
(74) *Attorney, Agent, or Firm* — Donald E. Stout; Stout, Uxa & Buyan, LLP

(57) ABSTRACT

A liquid crystal on silicon (LCOS) display includes a substrate; a wafer disposed on a top surface of the substrate; a liquid crystal (LC) layer disposed on a top surface of the wafer; a sealant enclosing the LC layer; an electrode layer disposed on a top surface of the LC layer, which is confined by the wafer, the sealant and the electrode layer; at least one conductive adhesive disposed and electrically coupled between the electrode layer and the substrate; and a barrier disposed adjacent to the conductive adhesive and disposed between the electrode layer and the wafer to block particles of the conductive adhesive from entering a location between the electrode layer and the wafer.

20 Claims, 5 Drawing Sheets

US 10,831,073 B1

LIQUID CRYSTAL ON SILICON DISPLAY AND A METHOD OF FORMING THE SAME

BACKGROUND OF THE INVENTION

1. Field of the Invention

The present invention generally relates to a liquid crystal on silicon (LCOS) display, and more particularly to a LCOS display with a barrier.

2. Description of Related Art

Liquid crystal on silicon (LCOS) is a miniaturized reflective active-matrix liquid-crystal display using a liquid crystal layer on top of a silicon wafer. LCOS may, for example, be adaptable to television projection, wavelength selective switching, structured illumination, near-eye displays and optical pulse shaping.

Silver glue is commonly used in the LCOS for electrical connection. However, silver particles of the silver glue may absorb moisture in a high temperature and humidity environment, and may migrate to a location between an indium tin oxide (ITO) electrode layer and a wafer, thereby lowering electrical potential and contrast of display.

A need has thus arisen to propose a novel LCOS display to overcome the drawbacks of conventional LCOS displays.

SUMMARY OF THE INVENTION

In view of the foregoing, it is an object of the embodiment of the present invention to provide a liquid crystal on silicon (LCOS) display with a barrier capable of preventing lowered electrical potential and contrast of display due to migrated silver particles.

According to one embodiment, a liquid crystal on silicon (LCOS) display includes a substrate, a wafer, a liquid crystal (LC) layer, a sealant, an electrode layer, at least one conductive adhesive and a barrier. The wafer is disposed on a top surface of the substrate. The LC layer is disposed on a top surface of the wafer, and is enclosed by the sealant. The electrode layer is disposed on a top surface of the LC layer, which is confined by the wafer, the sealant and the electrode layer. The conductive adhesive is disposed and electrically coupled between the electrode layer and the substrate. The barrier is disposed adjacent to the conductive adhesive and disposed between the electrode layer and the wafer to block particles of the conductive adhesive from entering a location between the electrode layer and the wafer.

DETAILED DESCRIPTION OF THE INVENTION

Figure 1:
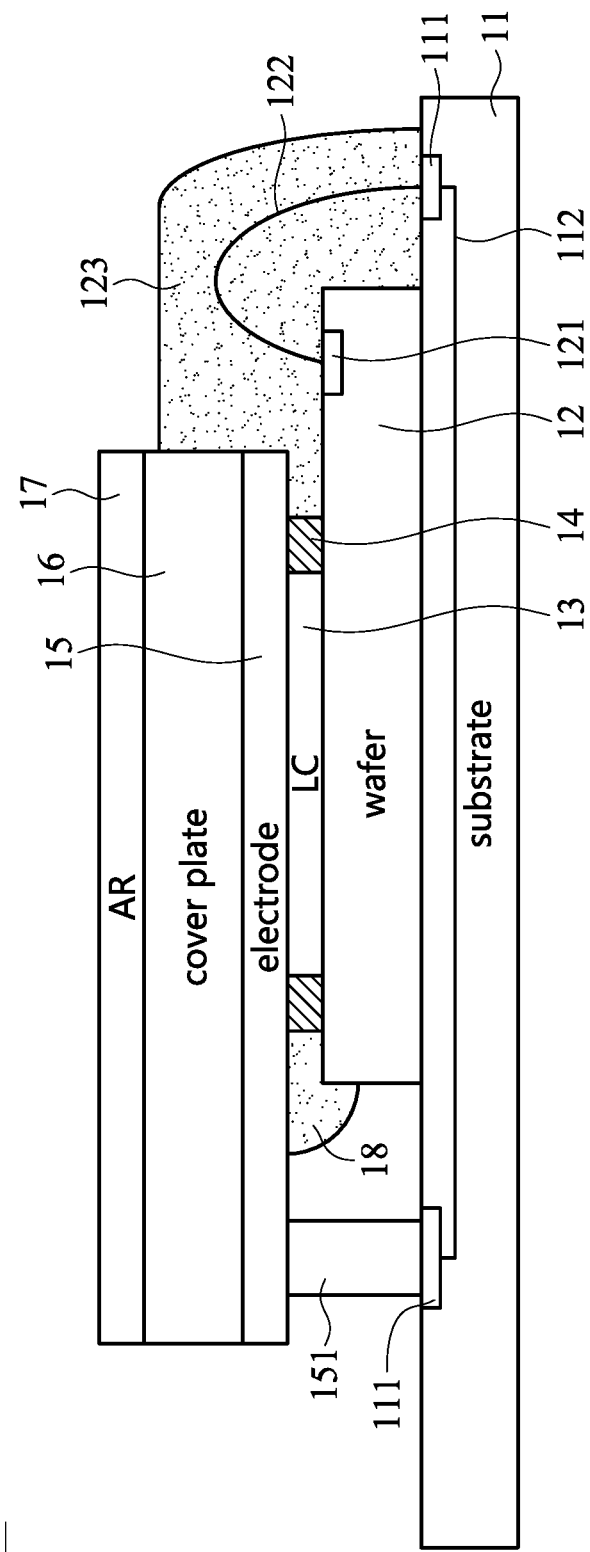
FIG. 1 shows a cross-sectional view illustrating a liquid crystal on silicon (LCOS) display according to one embodiment of the present invention.

FIG. 1 shows a cross-sectional view illustrating a liquid crystal on silicon (LCOS) display 100 according to one embodiment of the present invention. It is appreciated that only components pertinent to the embodiment are depicted.

In the embodiment, the LCOS display 100 may include a substrate 11 such as a printed circuit board (PCB), a flexible printed circuit (FPC) board or a semiconductor (e.g., silicon) substrate. A plurality of (first) bond pads 111 may be disposed on a top surface of the substrate 11, and some of the bond pads 111 may be electrically coupled through wires 112 disposed in or on the substrate 11.

The LCOS display 100 of the embodiment may include a wafer 12 (e.g., semiconductor wafer such as silicon wafer) disposed on the top surface of the substrate 11, for example, by flip chip bonding. The wafer 12 may include pixel electrodes (not shown) for active-matrix circuits, disposed on a top surface of the wafer 12. At least one (second) bond pad 121 may be disposed on the top surface of the wafer 12. At least one wire 122 (e.g., gold or aluminum wire) may be connected between the first bond pad 11 and the second bond pad 121, for example, by wire bonding. A protection part 123 (e.g., composed of glue such as ultraviolet glue) may be disposed on the substrate 11 and the wafer 12 to cover and protect the wire 122.

The LCOS display 100 of the embodiment may include a liquid crystal (LC) layer 13 disposed on the top surface of the wafer 12 and enclosed by a sealant 14 (e.g., glue sealant ring). The LCOS display 100 may include a transparent electrode layer 15 (e.g., indium tin oxide (ITO) electrode layer) disposed on a top surface of the LC layer 13 (and the sealant 14) such that the liquid crystals of the LC layer 13 may be confined by the wafer 12, the sealant 14 and the electrode layer 15. At least one conductive adhesive 151 (e.g., silver glue post) may be disposed and electrically coupled between the electrode layer 15 and the first bond pad 111 (of the substrate 11).

In the embodiment, the LCOS display 100 may include a cover plate 16 (e.g., glass plate) disposed on a top surface of the electrode layer 15. The LCOS display 100 may further include an anti-reflective (AR) layer 17 disposed on a top surface of the cover plate 16 to reduce reflection.

According to one aspect of the embodiment, the LCOS display 100 may include a barrier (or dam) 18 (e.g., composed of glue such as ultraviolet (UV) glue or thermosetting glue) to be disposed adjacent to the conductive adhesive 151 and between the electrode layer 15 and the wafer 12 to block a free path of (silver) particles of the conductive adhesive 151 from entering a location between the electrode layer 15 and the wafer 12, thereby preventing lowered electrical potential and contrast of display due to migrated (silver) particles that absorb moisture in a high temperature and humidity environment. Specifically, as shown in FIG. 1, the barrier 18 may be adjacent to an (outer) side of the sealant 14, a partial bottom surface of the electrode layer 15, and a partial top surface of the wafer 12. Therefore, (silver) particles of the conductive adhesive 151 cannot migrate to a location between the electrode layer 15 and the wafer 12. The barrier 18 of the embodiment may preferably include a material with high thixotropy for preventing overflow) and/or low shrinkage rate (for achieving equilibrium stress).

FIG. 2A to FIG. 2D show cross-sectional views illustrating a method of forming a liquid crystal on silicon (LCOS) display such as the LCOS display 100 of FIG. 1. It is appreciated that only steps pertinent to the embodiment are depicted and described.

Figure 2A:
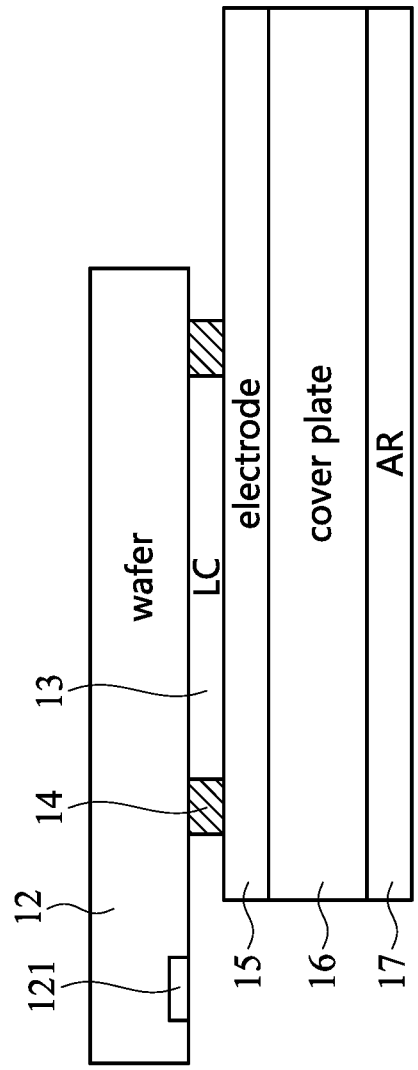
FIG. 2A to FIG. 2D show cross-sectional views illustrating a method of forming a liquid crystal on silicon (LCOS) display.

Specifically, as shown in an inverted view depicted in FIG. 2A, a structure composed of a wafer 12, a liquid crystal (LC) layer 13, a sealant 14, an electrode layer 15, a cover plate 16 and an anti-reflective (AR) layer 17 disposed as shown in FIG. 2A are provided as described in connection with FIG. 1. Specifically, the LC layer 13 may be disposed on a top surface of the wafer 12 and enclosed by the sealant 14. The transparent electrode layer 15 may be disposed on a top surface of the LC layer 13 (and the sealant 14) to confine the liquid crystals of the LC layer 13 by the wafer 12, the sealant 14 and the electrode layer 15. The cover plate 16 may be disposed on a top surface of the electrode layer 15, and the AR layer 17 may be disposed on a top surface of the cover plate 16.

Figure 2B:
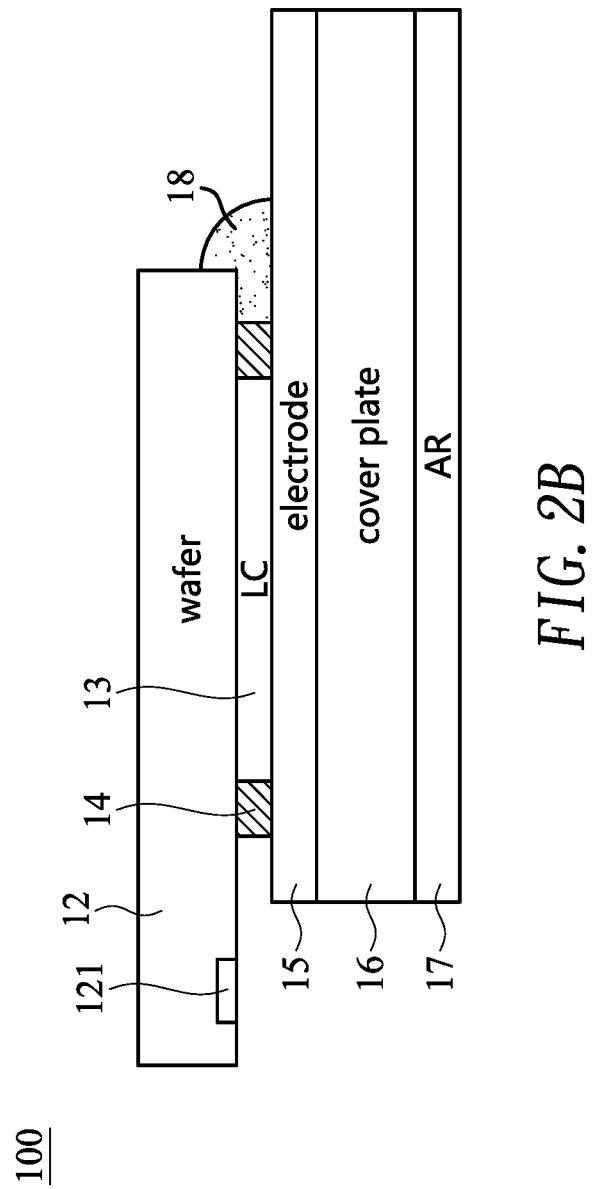

Next, as shown in an inverted view depicted in FIG. 2B, a barrier (or dam) 18 (e.g., composed of glue such as UV glue or thermosetting glue) may be disposed between the electrode layer 15 and the wafer 12, to block particles from entering a location the electrode layer 15 and the wafer 12. The barrier 18 may then be subjected to curing to harden the barrier 18. In one example, the barrier 18 and the sealant 14 may be cured at the same time.

Figure 2C:
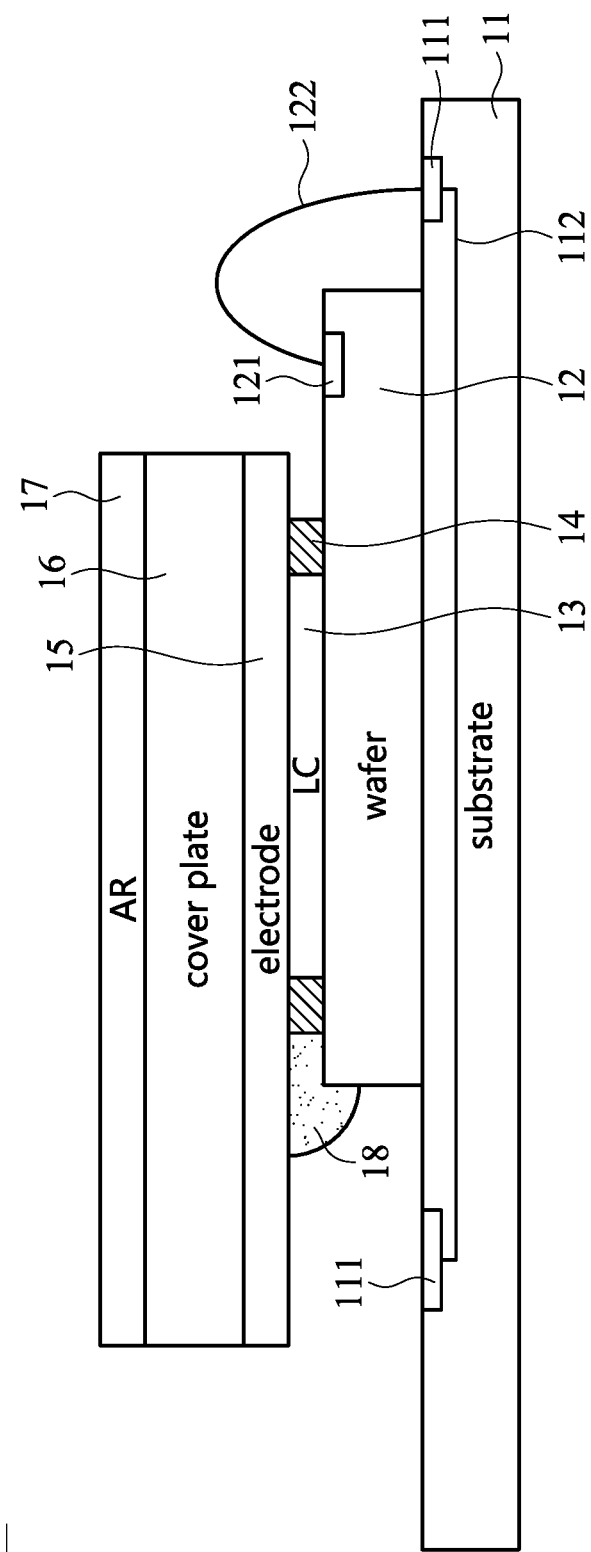

FIG. 2C shows an upright view after overturning the inverted structure of FIG. 2B into an upright position. Specifically, the wafer 12 may be disposed on a top surface of a substrate 11, for example, by flip chip bonding. Subsequently, at least one wire 122 (e.g., gold or aluminum wire) may be connected between a first bond pad 11 of the substrate 11 and a second bond pad 121 of the wafer 12, for example, by wire bonding.

Figure 2D:
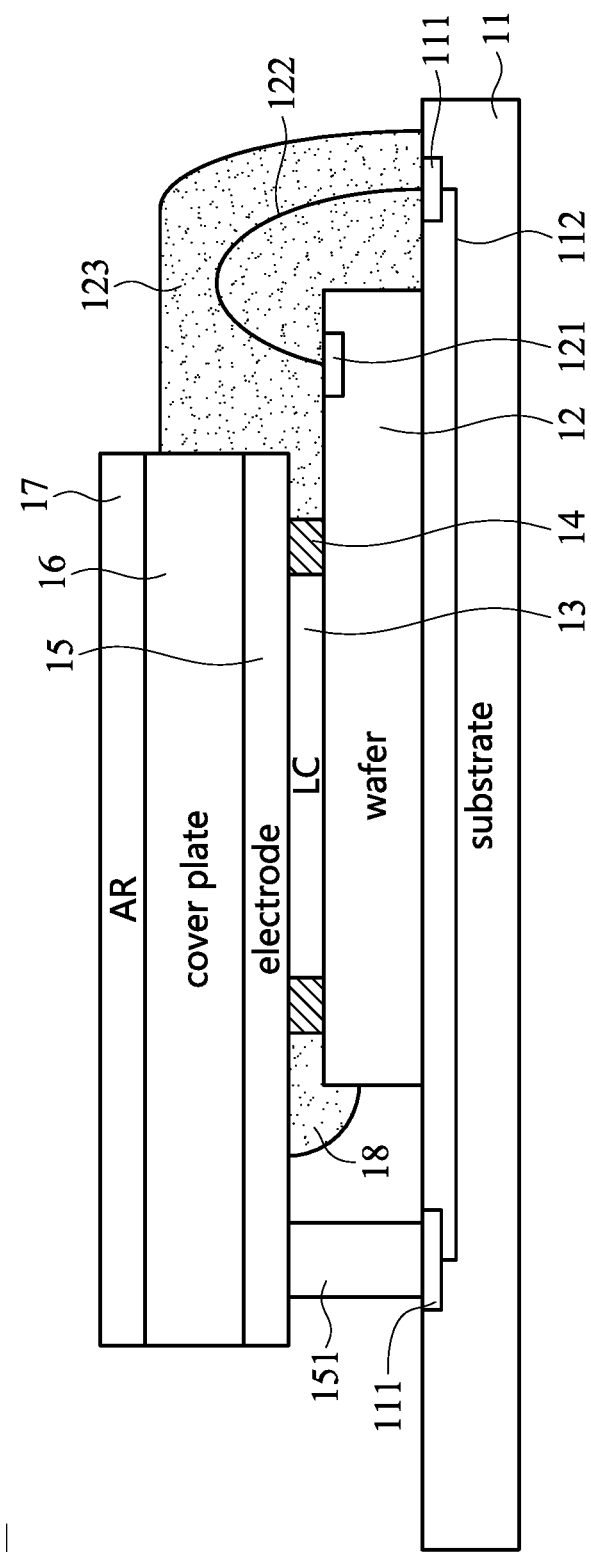

As shown in FIG. 2D, a protection part 123 (e.g., ultraviolet (UV) glue that can be cured by ultraviolet light) may be disposed (or dispensed) on the substrate 11 and the wafer 12 to cover and protect the wire 122. At least one conductive adhesive 151 (e.g., silver UV glue post) may be disposed (or dispensed) and electrically coupled between the electrode layer 15 and the first bond pad 111 (of the substrate 11).

Although specific embodiments have been illustrated and described, it will be appreciated by those skilled in the art that various modifications may be made without departing from the scope of the present invention, which is intended to be limited solely by the appended claims.

What is claimed is:

1. A liquid crystal on silicon (LCOS) display, comprising:
   a substrate;
   a wafer disposed on a top surface of the substrate;
   a liquid crystal (LC) layer disposed on a top surface of the wafer;
   a sealant enclosing the LC layer;
   an electrode layer disposed on a top surface of the LC layer, which is confined by the wafer, the sealant and the electrode layer;
   at least one conductive adhesive disposed and electrically coupled between the electrode layer and the substrate; and
   a barrier disposed adjacent to the conductive adhesive and disposed between the electrode layer and the wafer to block particles of the conductive adhesive from entering a location between the electrode layer and the wafer.

2. The display of claim 1, wherein the substrate comprises a printed circuit board.

3. The display of claim 1, wherein the substrate comprises:
   a plurality of first bond pads; and
   at least one wire disposed in or on the substrate to electrically couple the first bond pads.

4. The display of claim 3, wherein the wafer comprises:
   at least one second bond pad;
   wherein at least one wire is connected between the first bond pad and the second bond pad.

5. The display of claim 4, further comprising:
   a protection part disposed on the substrate and the wafer to cover and protect the wire.

6. The display of claim 1, wherein the wafer comprises silicon.

7. The display of claim 1, wherein the wafer is bonded to the substrate by flip chip bonding.

8. The display of claim 1, wherein the conductive adhesive comprises silver glue.

9. The display of claim 1, further comprising:
   a cover plate disposed on a top surface of the electrode layer; and
   an anti-reflective (AR) layer disposed on a top surface of the cover plate.

10. The display of claim 1, wherein the electrode layer comprises an indium tin oxide (ITO) electrode layer.

11. A method of forming a liquid crystal on silicon (LCOS) display, comprising:
    providing a structure composed of a wafer, a liquid crystal (LC) layer disposed on a top surface of the wafer, a sealant enclosing the LC layer, and an electrode layer disposed on a top surface of the LC layer, which is confined by the wafer, the sealant and the electrode layer;
    forming a barrier disposed between the electrode layer and the wafer to block particles from entering a location between the electrode layer and the wafer;
    disposing the wafer on a top surface of a substrate; and
    forming at least one conductive adhesive disposed and electrically coupled between the electrode layer and the substrate.

12. The method of claim 11, wherein the substrate comprises a printed circuit board.

13. The method of claim 11, wherein the substrate comprises:
    a plurality of first bond pads; and
    at least one wire disposed in or on the substrate to electrically couple the first bond pads.

14. The method of claim 13, wherein the wafer comprises:
    at least one second bond pad;
    wherein at least one wire is connected between the first bond pad and the second bond pad.

15. The method of claim 14, further comprising:
    forming a protection part disposed on the substrate and the wafer to cover and protect the wire.

16. The method of claim 11, wherein the wafer comprises silicon.

17. The method of claim 11, wherein the wafer is bonded to the substrate by flip chip bonding.

18. The method of claim 11, wherein the conductive adhesive comprises silver glue.

19. The method of claim 11, wherein the structure further comprises:
    a cover plate disposed on a top surface of the electrode layer; and
    an anti-reflective (AR) layer disposed on a top surface of the cover plate.

20. The method of claim 11, wherein the electrode layer comprises an indium tin oxide (ITO) electrode layer.

* * * * *